United States Patent [19]

Hoffer, Jr.

[11] Patent Number: 5,625,819
[45] Date of Patent: Apr. 29, 1997

[54] METHODS AND APPARATUS FOR PERFORMING HEAP MANAGEMENT AND PROTECTING DATA STRUCTURE INTEGRITY IN NON-VOLATILE MEMORY

[75] Inventor: John M. Hoffer, Jr., Quakertown, Pa.

[73] Assignee: Honeywell, Inc., Minneapolis, Minn.

[21] Appl. No.: 429,346

[22] Filed: Apr. 26, 1995

[51] Int. Cl.⁶ .................................................. G06F 17/30
[52] U.S. Cl. .................................................. 395/618
[58] Field of Search ...................... 395/618; 364/464.02

[56] References Cited

U.S. PATENT DOCUMENTS

| | | | |
|---|---|---|---|
| 4,845,632 | 7/1989 | Kroll et al. | 364/464.02 |
| 5,008,786 | 4/1991 | Thatte | 395/489 |
| 5,021,963 | 6/1991 | Brown et al. | 364/464.02 |
| 5,088,036 | 2/1992 | Ellis et al. | 395/600 |
| 5,317,752 | 5/1994 | Jewett et al. | 395/750 |
| 5,367,637 | 11/1994 | Wei | 295/250 |
| 5,491,808 | 2/1996 | Geist, Jr. | 395/427 |

FOREIGN PATENT DOCUMENTS

0526139A3  2/1993  European Pat. Off. .................. 17/2

OTHER PUBLICATIONS

Motorola, Inc.: MC68020 32 bit Microprocessor User's Manual, see pp. D8–D11 Dec. 1985.

Duncan, "The MS–DOS Encyclopedia", pp. 297–305 Dec. 1988.

*Primary Examiner*—Wayne Amsbury
*Attorney, Agent, or Firm*—Joseph J. Kaliko

[57] ABSTRACT

Methods and apparatus for performing heap management in programmable recording instruments used to record process data; and protecting the integrity of data structures stored in non-volatile memory included such instruments should a power failure or power shut down occur while heap management operations are in progress. Furthermore, according to the invention, methods and apparatus are provided for (a) validating the integrity of the aforementioned data structures quickly on power up of the recording instrument; (b) finishing certain predetermined processes that were in progress when a power failure occurred, at the time when the recording instrument is powered back up; (c) locating any memory allocated to a user prior to a power failure or shut down; and (d) assuring the user, whenever power is restored to the system, that only pointers to previously allocated data blocks containing valid data are provided in response to users requests for such pointers.

21 Claims, 10 Drawing Sheets

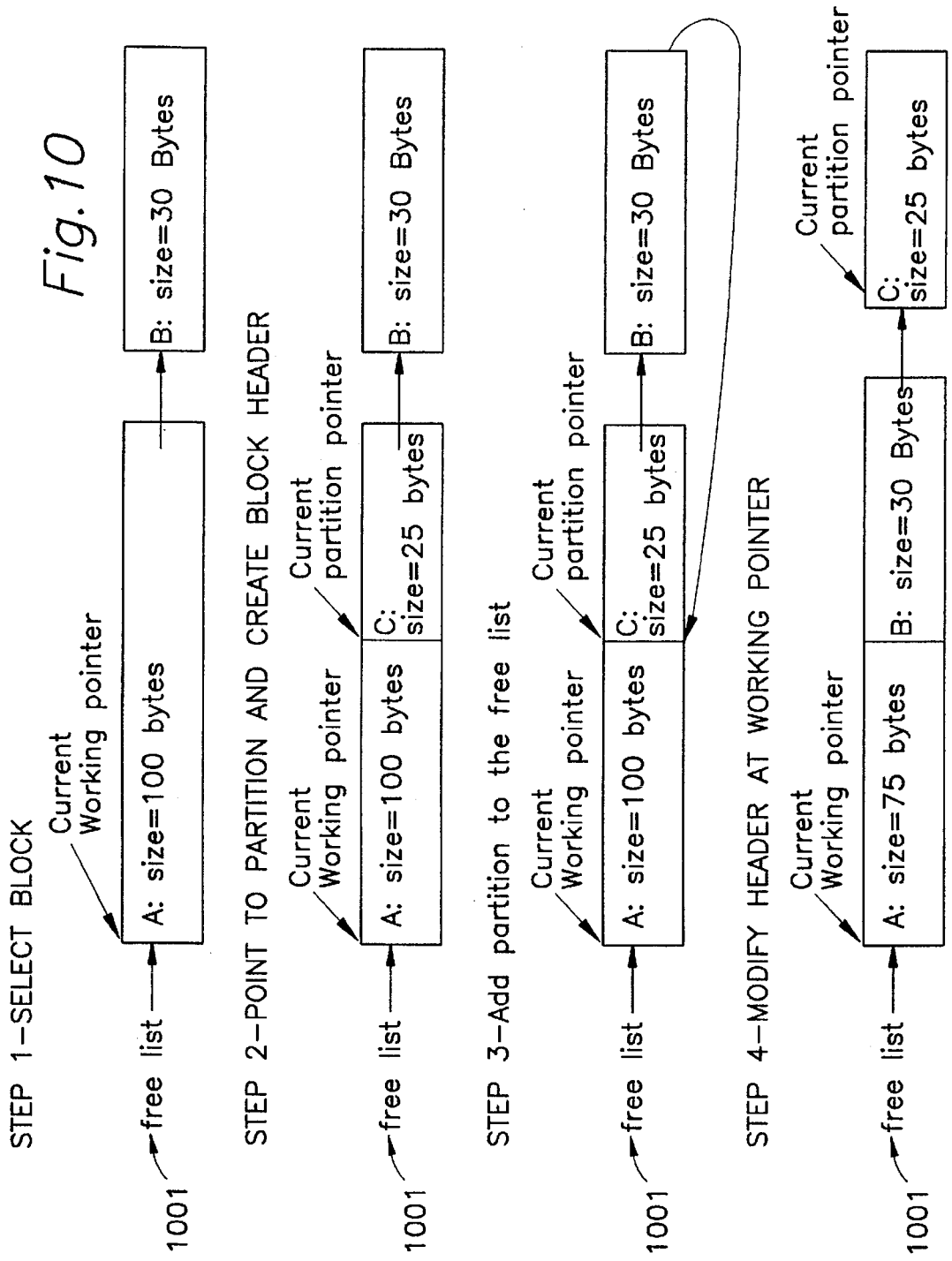

METHODS AND APPARATUS FOR PERFORMING HEAP MANAGEMENT AND PROTECTING DATA STRUCTURE INTEGRITY IN NON-VOLATILE MEMORY

BACKGROUND OF THE INVENTION

1. Field of the Invention

The invention relates generally to methods and apparatus used for performing non-volatile memory "heap management", defined herein as allocating and/or freeing blocks of memory as requested by a user, in a manner that protects the integrity of the heap management data structure stored in the memory.

More particularly, the invention relates to methods and apparatus for performing heap management in programmable recording instruments used to record process data; and protecting the integrity of data structures stored in non-volatile memory included such instruments should a power failure or power shut down occur while heap management operations are in progress.

Furthermore, according to the invention, methods and apparatus are provided for (a) validating the integrity of the aforementioned data structures quickly on power up of the recording instrument; (b) finishing certain predetermined processes, that were in progress when a power failure occurred, at the time when the recording instrument is powered back up; (c) locating any memory allocated to a user prior to a power failure or shut down; and (d) assuring the user, whenever power is restored to the system, that only pointers to previously allocated data blocks containing valid data are provided in response to users requests for such pointers.

2. Description of the Related Art

Methods and apparatus are well known for managing the heap in, for example, volatile random access memory (VRAM). For example standard, commercially available C malloc (memory allocation) and free (memory deallocation) utilities, used for VRAM heap management purposes, are well known by those skilled in the art.

In particular, heap management for VRAM can be accomplished by the user maintaining two lists. One list is a list of all blocks of memory that are not in use, often referred to as a "free list" of memory blocks; and a second list, which is a list of all memory blocks that are in use, often referred to as the "used" or "allocated" list of memory blocks.

Techniques for VRAM list management per se, including procedures for adding and removing memory blocks from the aforementioned lists; procedures for efficiently locating properly sized blocks of memory to allocate; procedures for splitting and coalescing blocks for increasing allocation options and facilitating the efficient use of memory resources, etc., are also all known in the art.

In the VRAM context, when the recording instrument is powered down intentionally or due to a power failure, none of the memory is sustained unless an alternate source of power exists. Assuming no such alternate power source, all the heap is free (available to be allocated again) when the machine is powered back up. There is no need to worry about data structure corruption or having to locate previously allocated memory on power up.

In applications where it is important to insure the integrity of heap management data structures, and other data stored in memory, well known approaches for achieving this objective include the use of an uninterruptible power source to insure power at all times to the recording instrument itself; and/or the use of some type of "non-volatile" or "backed" memory device in the instrument, i.e., using a memory device that preserves the data structures and data stored therein for at least some predetermined time period.

Examples of non-volatile (backed) memory devices include capacitor backed random access memory (RAM), which preserves data stored therein over the time frame during which the capacitor discharges (thereby provides power to the memory device); battery backed RAM, etc.

For these types of recording instruments (those including some form of non-volatile memory for storing heap management data structures and process data); the prior art memory allocation and memory free utilities are problematic since: (a) if power goes down while removing or adding an entry to a list, parts of the list can be lost or the lists can be cross-linked depending on the list management technique used; (b) if power goes down while splitting or coalescing blocks, block sizes can be wrong; and (c) there is no way to get memory allocated before the power went down back to the user and at the same time assure the integrity of the previously allocated memory, after a power failure or reset has occurred.

Another prior art technique for preserving the integrity of data structures and the data stored in a non-volatile memory device, while avoiding the aforementioned problems associated with splitting and coalescing memory blocks, is to require the use of memory blocks having fixed pre-allocated sizes for storing data. This technique, although addressing some of the aforementioned problems, wastes often limited non-volatile memory resources.

Still other prior art methods and apparatus for recording process data are set forth in copending patent application Ser. No. (attorney Docket Number LT-2973), filed on Apr. 25, 1995, assigned to the same assignee as the present invention. This copending patent application is hereby incorporated by reference for background purposes.

In the incorporated copending application, backed RAM is preferably used to stage data transfer to a removable storage medium (like a floppy disk) inserted into the recording instrument. According to a preferred embodiment of the invention described in the incorporated copending patent application, the backed RAM contents are periodically transferred to the removable media; but in the mean time the backed RAM is used to store potentially large quantities of process data over extended periods of time.

In applications such as those described in the incorporated copending patent application, i.e., for recording instruments being used to record process data where the instrument itself is not typically furnished with an uninterruptible power source, where the recording instrument utilizes non-volatile memory for data integrity purpose with the quantity of such memory space being limited and at a premium, etc., it is desirable to efficiently allocate the non-volatile memory resource (e.g., the backed RAM) to maximize the number of data blocks that can be made available for storing the varying quantities of information collected in the process data gathering and recording context.

More generally, for all of the reasons set forth hereinabove, it would be desirable to provide methods and apparatus for performing heap management in programmable recording instruments used to record process data; and at the same time protect the integrity of data structures stored in non-volatile memory included in such instruments should a power failure or power shut down occur while heap management operations are in progress.

Furthermore, it would be desirable to provide methods and apparatus for validating the integrity of the aforementioned data structures quickly on power up of the recording instrument.

Still further, it would be desirable to provide methods and apparatus for insuring the stability of further heap management processing following the occurrence of a power failure of reset.

Further yet, it would be desirable to provide methods and apparatus for locating any memory allocated to a user prior to a power failure or shut down; and assuring, whenever power is restored to the instrument, that only pointers to previously allocated data blocks containing valid data are provided in response to users requests for such pointers.

SUMMARY OF THE INVENTION

Accordingly it is an object of the invention to provide methods and apparatus for performing heap management in programmable recording instruments used to record process data; and at the same time protect the integrity of data structures stored in non-volatile memory included in such instruments should a power failure or power shut down occur while heap management operations are in progress.

Furthermore, it is an object of the invention to provide methods and apparatus for validating the integrity of the aforementioned data structures quickly on power up of the recording instrument.

Still further, it is an object of the invention to provide methods and apparatus for insuring the stability of further heap management processing following the occurrence of a power failure of reset.

Further yet, it is an object of the invention to provide methods and apparatus for locating any memory allocated to a user prior to a power failure or shut down; and assuring, whenever power is restored to the instrument, that only pointers to previously allocated data blocks containing valid data are provided in response to users requests for such pointers.

Still another object of the present invention is to provide methods and apparatus which efficiently allocate the non-volatile memory resource (e.g., the backed RAM), in a programmable recording instrument used to record process data, to maximize the number of data blocks that can be made available for storing the varying quantities of information to be recorded.

According to a first aspect of the invention, a method for performing heap management and protecting the integrity of data structures created and stored in non-volatile memory included in a programmable recording instrument used for recording process data, comprises the steps of: (a) defining a memory header data structure used for managing run time recorder operations and aiding in the recovery of any data structures being modified when and if power to the memory is lost, wherein the memory header includes a first pointer to a list of free memory blocks and a second pointer to a list of allocated memory blocks; (b) defining an allocated memory block header, stored within each allocated memory block, used for determining block attributes, including an indicator to signal when a given memory block has been locked into the list of allocated memory blocks, a block ownership indicator and a pointer to the next allocated memory block, if any; (c) initializing the non-volatile memory whenever the recording instrument is powered up, including the steps of determining if the non-volatile memory is to be reset and the step of verifying the stability of non-volatile memory whenever non-volatile memory is not reset; (d) allocating memory from one of the memory blocks included in the list of free memory blocks, in response to a user request for memory allocation, utilizing only atomic instructions (a single assembly language instruction) to modify the memory header and the allocated memory block header; and (e) locking an allocated memory block into the list of allocated memory blocks in response to a user request for the lock.

A method in further accord with this first aspect of the invention further comprises the step of freeing a memory block included in the list of allocated memory blocks, in response to a user request for freeing memory, utilizing only atomic instructions to modify the memory header and the allocated memory block header.

According to a further aspect of the invention, a "state" indicator is maintained in the aforementioned memory header which is modified by one atomic instruction. Any time a list is modified or a memory block header is modified (split or coalesced), the state is set to indicate what is occurring.

If power goes down while performing a heap management operation, and then power comes back up, the state is used to determine the last function that was performed to provide an indication of whether or not the non-volatile memory data structures that support heap management are "stable". If "unstable", stability can be achieved by finishing certain predetermined processes that were in progress when a power failure occurred, at the time when the recording instrument is powered back up. Non-volatile memory data structures can then be recovered using other entries in the memory header (to be described in detail hereinafter).

With regard to finishing operations in progress when, for example, recovering from a power failure, the heap management techniques contemplated by the preferred embodiment of the invention will never put blocks in the used list (list of allocated memory blocks). If power went down while trying to allocate a block of memory, it is known that the user was never given the memory. However, if power went down while trying to free a block of memory, the processes contemplated by the invention will continue where they left off (for example, in trying to coalesce blocks of free memory, etc.), and put the appropriate block of memory into the free list.

According to yet another aspect of the invention, the order in which data structures are manipulated is important so that there is a pointer to all blocks of memory at any point in time.

According to still another aspect of the invention, to avoid cross linking lists (a) entries are always completely removed from one list before they are added to the other list; (b) removal of an entry from a list is always accomplished utilizing one atomic instruction; and (c) adding an entry to a list is performed utilizing two atomic instructions (to be described in detail hereinafter), performed in a predefined order.

To avoid having incorrect block sizes specified following a power failure or reset, the preferred embodiment of the invention calls for utilizing a "partition pointer" to point to a block being coalesced or to the location in a block where a division will occur. A "working pointer" will already be pointing to the other block being coalesced or the block being split. These two pointers together, as will be demonstrated hereinafter, can be used to determine if the header size in a block is correct.

Yet another aspect of the invention solves the problem of returning only valid allocated memory to a user during power up by adding a unique user ID to each block of memory; and only allowing memory blocks previously "locked" by a user into the list of allocated memory blocks (to acknowledge block validity), to be returned. When the recording instrument powers up, according to the preferred embodiment of the invention, it will remove all unacknowledged ("unlocked") memory blocks from the used list and put them back in the free list.

The invention may be alternately characterized as a method for performing heap management and protecting the integrity of data structures created and stored in non-volatile memory included in a programmable recording instrument used for recording process data, comprising the steps of: (a) allocating blocks of memory as requested by a user, wherein the step of allocating further comprises the step of maintaining blocks of allocated memory in a first list of memory blocks managed utilizing a memory header and further wherein each allocated memory block in the first list is further managed utilizing an allocated memory block header located within each allocated memory block; (b) freeing blocks of memory as requested by a user, wherein the step of freeing further comprises the step of maintaining blocks of free memory in a second list of memory blocks managed utilizing the memory header; (c) completely removing a specified allocated memory block from the first list before adding the specified allocated memory block to the second list, to prevent cross linking of the first and second list when performing the step of freeing; (d) completely removing a specified free memory block from the second list before adding the specified free memory block to the first list to prevent cross linking of the first and second list when performing the step of allocating; (e) locking an allocated memory block into the first list in response to a user request for the lock; (f) providing a pointer to a block of memory owned by a user, in response to a user request for such pointer, only if the memory block containing the memory has been locked into the first list; and (g) utilizing only atomic instructions to modify the memory header and the allocated memory block header.

The invention is also directed to apparatus for performing heap management and protecting the integrity of data structures created and stored in non-volatile memory included in a programmable recording instrument used for recording process data, comprising: (a) programmable data processing means, including: (a1) means for initializing non-volatile memory used for at least temporarily storing process data; (a2) means for allocating memory blocks upon request; (a3) means for freeing allocated memory upon request; (a4) means for locking data blocks into a list of allocated memory blocks upon request; and (a5) means for obtaining and returning pointers to previously locked allocated blocks of memory upon request following a restoration of power to the instrument; and (b) non-volatile memory means, coupled to the programmable data processing means, for at least temporarily storing raw process data received and/or derived by the instrument, wherein the non-volatile memory includes a memory header data structure used for managing run time recorder operations and aiding in the recovery of any data structures being modified when and if power to the memory is lost, and an allocated memory block header, stored within each allocated memory block, used for determining block attributes, including an indicator to signal when a given memory block has been locked into the list of allocated memory blocks, a block ownership indicator and a pointer to the next allocated memory block in the list of allocated memory blocks, if any, wherein the contents of the memory header data structure and the allocated memory block header may only be modified utilizing atomic instructions.

The invention features the ability to perform heap management in programmable recording instruments in a manner that protects the integrity of data structures stored in non-volatile memory included in such instruments should a power failure or power shut down occur while heap management operations are in progress.

Furthermore, the invention features methods and apparatus for (a) validating the integrity of the aforementioned data structures quickly on power up of the recording instrument; (b) insuring the stability of further heap management processing following the occurrence of a power failure of reset; and (c) locating any memory allocated to a user prior to a power failure or shut down, and at the same time assuring, whenever power is restored to the instrument, that only pointers to previously allocated data blocks containing valid data are provided in response to users requests for such pointers.

The invention also features the ability to efficiently allocate the non-volatile memory resource (e.g., the backed RAM), in a programmable recording instrument used to record process data, to maximize the number of data blocks that can be created and accommodate the varying quantities of information to be recorded.

These and other objects, embodiments and features of the present invention and the manner of obtaining them will become apparent to those skilled in the art, and the invention itself will be best understood by reference to the following Detailed Description read in conjunction with the accompanying Drawing.

BRIEF DESCRIPTION OF THE DRAWING

FIG. 10 depicts, in accordance with the teachings of the invention, an exemplary set of steps indicating how a partition pointer may be used to partition a memory block, in a manner that protects data structure integrity.

DETAILED DESCRIPTION

Figure 1:
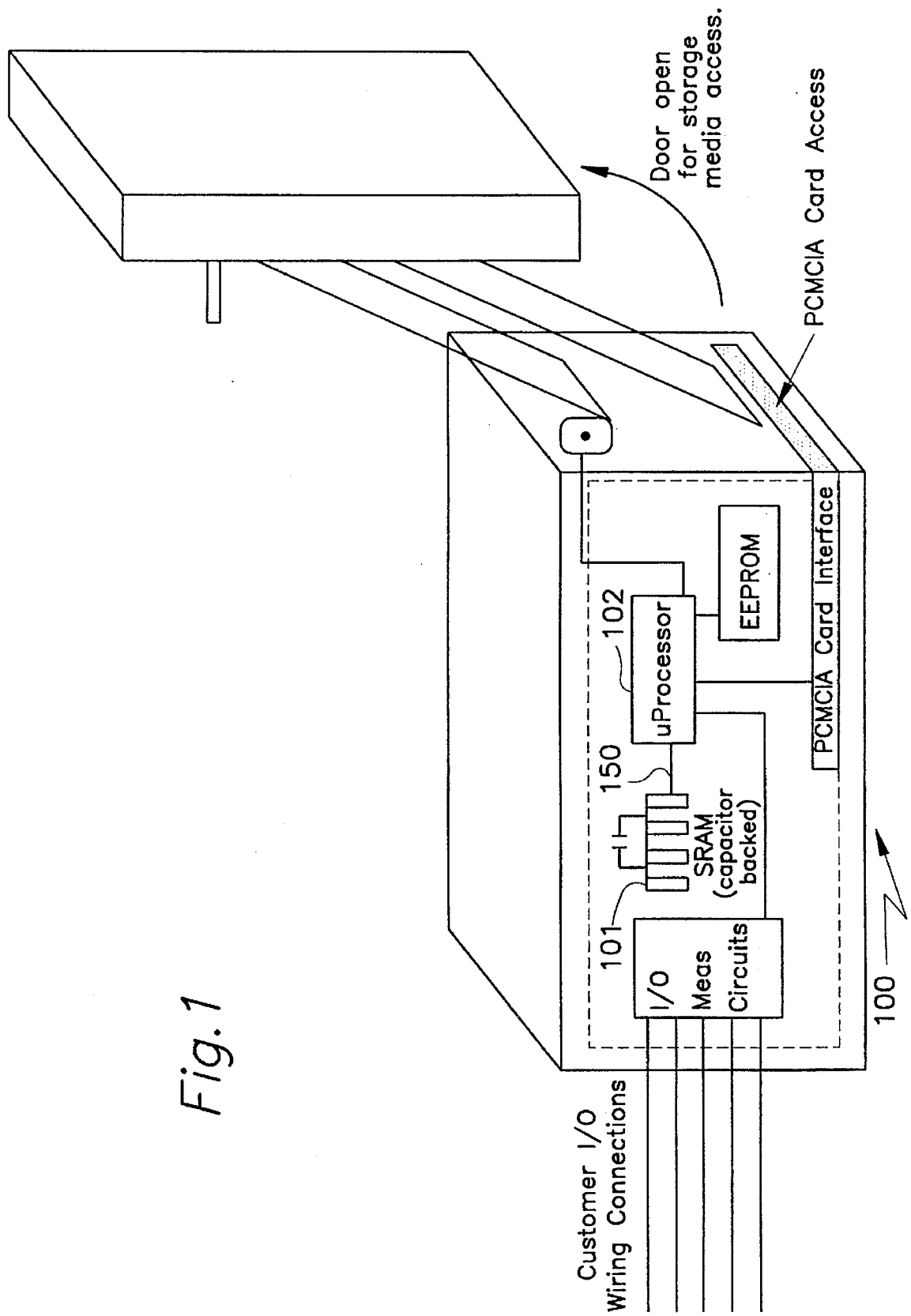
FIG. 1 depicts an exemplary programmable process data recording instrument, of the type contemplated by one aspect of the invention, that includes non-volatile memory, in the form of a capacitor backed RAM, for at least temporarily storing process data being recorded by the instrument.

Prior to describing the details of the apparatus and process steps contemplated by the invention, certain requirements and assumptions have been made regarding the processing environment in which the invention may be practiced. The assumptions made are for the sake of conveniently illustrating the principals of the invention and are not intended to limit the scope or spirit of the invention.

The recording instruments in which the invention may be practiced are assumed to be "programmable" devices; that is, devices that are provided with access to (and execute) programs which implement the various processes described herein for performing heap management and protecting the integrity of data structures created and stored in non-volatile memory included in the instrument.

Specific examples of commercially available recording devices of the type contemplated by the invention (used to record process data) are microprocessor based video recorders and controllers available from Leeds & Northrup Company.

Those skilled in the art will readily be able to implement the processes described herein in the form of programs suitable for execution by a microprocessor after reviewing the description of the invention set forth hereinafter with reference to the various flow charts depicted in the Drawing.

Furthermore, in order to practice the preferred embodiment of the instant invention:

(1) All entries in any of the data structures defined herein may only be changed using a single assembly instruction (they must be atomic operations).

(2) There must be a mechanism that will keep the recording unit from starting the execution of an instruction if power starts to go down. This may be accomplished, for example, by causing an interrupt to be triggered when power starts to go down, monitoring a non-maskable interrupt line and not servicing the interrupt until the last instruction being executed by the instrument is completed (assuming further that there is enough time to complete the last operation from the time the interrupt is triggered until the power gets too low to sustain processor operation).

(3) An external clock must exist that keeps time even when the recording instrument is powered off.

According to the embodiment of the invention described hereinafter with reference to FIG. 1, a capacitor backed RAM is used for the purposes of describing the invention, where the capacitor insures that if external power to the instrument is interrupted the RAM contents will be maintained for (in the exemplary capacitor backed RAM instance) the discharge life of the capacitor (e.g., approximately 90 minutes in one embodiment of the invention). Again, it is not necessary for the RAM included in the recording instrument to be capacitor backed (it could for example be battery backed).

Finally, before making reference to FIG. 1, it should be understood that according to the context in which the invention is set forth:

(1) Heap management is a matter of allocating and freeing blocks of memory as requested by the user. There are two lists that are kept. One list is a list of all blocks of memory that are not in use which is called the free list. The other list is a list of blocks of memory that are in use which is called the used list.

(2) It is assumed that the free list is a sorted list organized based on the size of the free blocks. The largest block is the first entry in the list. The used list is not sorted. All new entries to this list are placed in the front of the list.

(3) It is assumed that when a user requests memory, the heap management processes in which the invention is practiced search the free list to see if there is a block of free memory that is the exact same size as the amount of memory that has been requested. If an exact match is found, that block of memory is selected. If an exact match cannot be found, the largest block is divided into two blocks, one that is the exact size requested and the remaining memory makes up the other. The remaining memory block is placed in the free list based on its size and the new exact size block is now selected. The selected block is removed from the free list and added to the used list. A pointer to the memory (located right after the allocated memory block header to be described in detail hereinafter with reference to FIG. 3) is then returned to the user.

(4) To free memory, the block is removed from the used list and added to the free list. When adding to the free list, there is first a check to see if there are free memory blocks on either side of the memory block that is being freed. If so, these free blocks are coalesced with the one now being freed. Any coalesced blocks are temporarily removed from the free list. The block being freed (including any coalesced memory) is then added to the free list based on the size of the block.

Reference should now be made to FIG. 1 which, as indicated hereinbefore, depicts an exemplary programmable process data recording instrument 100, of the type contemplated by one aspect of the invention (described in detail in the previously incorporated copending patent application), that includes non-volatile memory 101, in the form of a capacitor backed RAM, for at least temporarily storing process data being recorded by instrument 100.

In particular, exemplary programmable process data recording instrument 100 shown in FIG. 1 depicts the device as including:(a) programmable data processing means 102 (shown as a microprocessor), having access to (according to the preferred embodiment of the invention), program utilities that implement the various processes described herein for performing heap management and protecting the integrity of data structures created and stored in non-volatile memory 101. Non-volatile memory 101 is also shown in FIG. 1 to be coupled to programmable data processing means 102 via link 150, and may be used for at least temporarily storing raw process data received and/or derived by instrument 100.

The other component of instrument 100 are described in the previously incorporated copending patent application and will not be discussed further hereinafter since they do not relate to the description of the present invention being set forth herein.

According to the invention, non-volatile memory 101 includes two important data structures for heap management purposes. First, a memory header data structure (to be explained in detail hereinafter with reference to FIG. 2) used for managing run time recorder operations and aiding in the recovery of any data structures being modified when and if power to instrument 100 is lost; and secondly, an allocated memory block header, stored within each allocated memory block (to be explained in detail hereinafter with reference to FIG. 3), used for determining block attributes, including an indicator to signal when a given memory block has been locked into a list of allocated memory blocks, a block ownership indicator and a pointer to the next allocated memory block, if any.

As indicated hereinbefore, and as will be explained further hereinafter, the contents of the memory header data structure and the allocated memory block header may only be modified utilizing atomic instructions.

The aforementioned program utilities contemplated by the preferred embodiment of the invention are preferably, although not necessarily, implemented via software that can be executed by data processing means 102. When made available to data processing means 102 and executed thereby (in the context of a programmable recording instrument like instrument 100), instrument 100 is transformed into apparatus of the type contemplated by the invention.

Each of the program utilities contemplated herein are actually specific implementations of the following more generic means, which may all be readily implemented by those skilled in the art with reference to the flowcharts shown in FIG. 4 thru FIG. 8 (inclusive), and the description set forth hereinafter with respect to these figures: (1) means for initializing non-volatile memory that is used for at least temporarily storing process data; (2) means for allocating memory blocks upon request; (3) means for freeing allocated memory upon request; (4) means for locking data blocks in allocated memory upon request; and (5) means for obtaining and returning pointers to previously locked allocated blocks of memory upon request following a restoration of power to the instrument. These various means taken together are suitable for realizing the aforestated objects of the invention; and the various embodiments as aspects thereof as described hereinbefore in the Summary of The Invention.

The database upon which the preferred program utilities operate includes the aforementioned memory header data structure and allocated memory block header, described with reference to FIG. 2 and FIG. 3, respectively, hereinafter.

Figure 2:
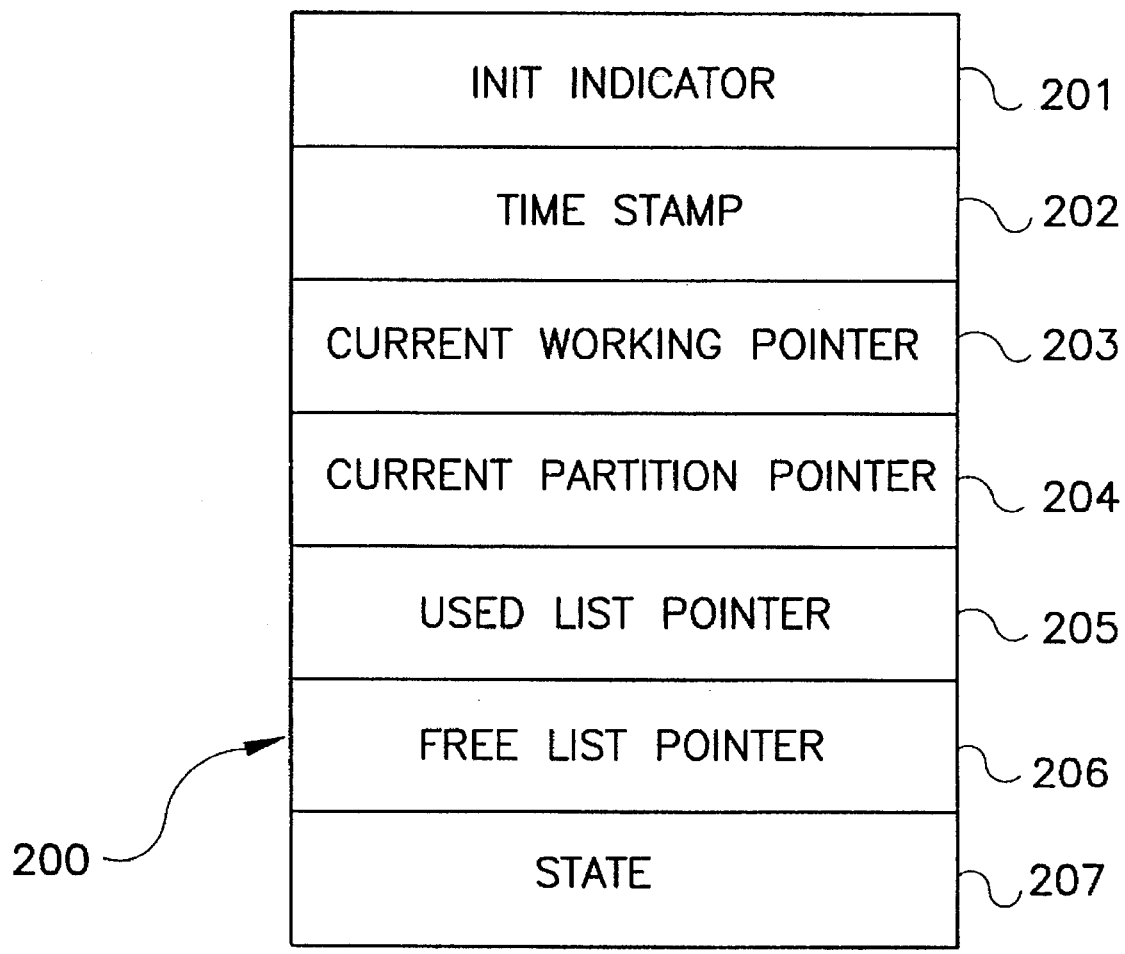
FIG. 2 depicts the form and content of an exemplary memory header data structure, of the type contemplated by a preferred embodiment of the invention, suitable for use in performing run-time non-volatile memory heap management and data structure recovery following a power failure or reset.

Reference should now be made to FIG. 2 which, as previously indicated, depicts the form and content of an exemplary memory header data structure 200, of the type contemplated by a preferred embodiment of the invention, suitable for use in performing run-time non-volatile memory heap management and data structure recovery following a power failure or reset.

In particular FIG. 2 depicts preferred memory header 200 including the following entries used by the processes contemplated by the invention in the manner described hereinafter:

(a) Initialization (Init) Indicator 201 may be used to determine if non-volatile memory has been initialized. If the value (for example, a predefined initialization completion code) is not in this part of the memory header when the non-volatile memory is initialized, it is assumed, according to one embodiment of the invention, that all of the memory must be returned to the aforementioned free list.

(b) Time Stamp 202, a memory location that is updated at a fixed interval when the time stamp function (which is optional) is used, may be used to determine how long power was off during a power failure when the instrument is rebooted. Those skilled in the art will readily appreciate that in cases where the non-volatile memory has a window within which the memory is backed (such as when a capacitor is used to back the memory), the time stamp entry should be included in the memory header contemplated by the invention to determine if valid data remains in the backed memory when power is restored to the instrument. By way of contrast, the entry may not be needed if, for example, a battery backed RAM is used for non-volatile memory. If Init Indicator 201 is valid, according to one embodiment of the invention, it can be assumed that the time in Time Stamp 202 is a valid time on power up. According to the preferred embodiment of the invention, the time must be written to Time Stamp 202 at a fixed interval. The length of the interval depends on how accurate the time difference calculation used to determine how long the unit was powered down (such as finding the difference between the time in Time Stamp 202 and the time when power is restored to the instrument), needs to be.

(c) Current Working Pointer 203, points to a block of memory that is being allocated or freed. This pointer will locate a block that was being manipulated when power went down.

(d) Current Partition Pointer 204, points to a block of memory that will be split off from a larger block of memory or will be coalesced (joined) with another block of memory. More particularly, Current Partition Pointer 204 points to a block of memory that is being separated from a block of memory that is pointed to by Current Working Pointer 203 during a memory allocation. It may also point to a block of memory that is being combined with a block of memory pointed to by Current Working Pointer 203 during a free.

(e) Used List Pointer 205, points to the first entry of a list of memory blocks that are in use. The list pointed to is the aforementioned list of allocated memory blocks in non-volatile memory.

(f) Free List Pointer 206, points to the first entry of a list of memory blocks that are not in use (free memory blocks in the aforementioned free list) in the non-volatile memory.

(g) State Indicator 207, is one of a predetermined set of values used to determine the stability of non-volatile memory upon recovery from a power loss and determine the last operation performed in the heap management process before power was lost, as will be explained in greater detail hereinafter.

Figure 3:
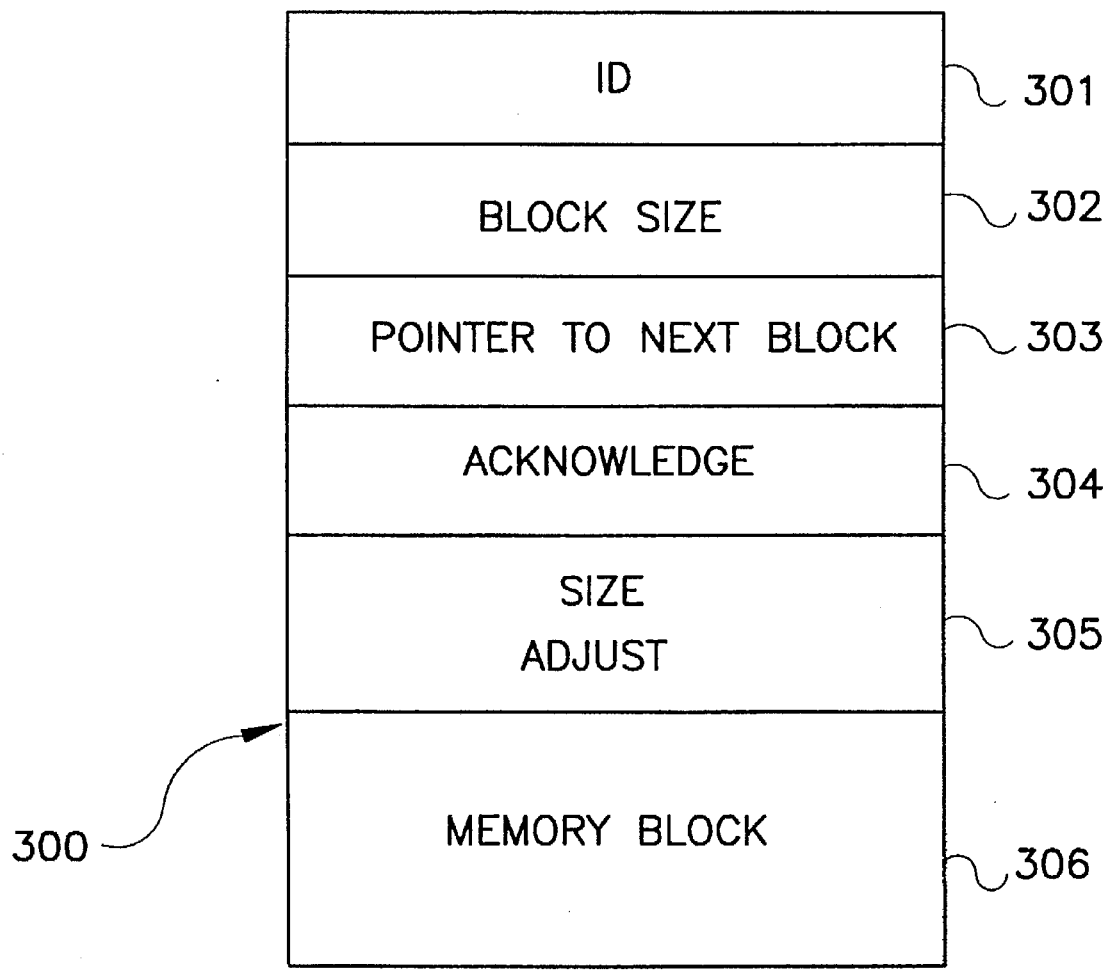
FIG. 3 depicts the form and content of an exemplary allocated memory block header, of the type contemplated by a preferred embodiment of the invention, which may be used in conjunction with the memory header depicted in FIG. 2 (but on a per block basis), in performing non-volatile memory heap management and data structure recovery following a power failure or reset.

Reference should now be made to FIG. 3 which, as indicated hereinbefore, depicts the form and content of an exemplary allocated memory block header 300, of the type contemplated by a preferred embodiment of the invention, which may be used in conjunction with memory header 200 depicted in FIG. 2 (but on a per block basis for every block allocated), in performing non-volatile memory heap management and data structure recovery following a power failure or reset. As indicated hereinbefore, the entries in allocated memory block header 300 describe attributes about the block, the owner and a pointer to the next allocated block, if any.

In particular, FIG. 3 depicts preferred allocated memory block header 300 including the following entries used by the processes contemplated by the invention in the manner described hereinafter:

(a) ID 301, is a unique identifier that is defined by the user of each block. According to one embodiment of the invention ID 301 is specified by the user when the block is allocated. Furthermore, according to the illustrative embodiment of the invention being set forth herein, all users of the non-volatile memory must agree to use different identifiers.

(b) Block Size 302, is a value indicating the actual size of the memory block that has been allocated, not including the header. According to the illustrative embodiment of the invention, it is a multiple of a minimum block size that is used to control fragmentation of the allocated memory.

(c) Pointer To Next Block 303, is an entry that points to the next block in the list. If the entry is in the used list, it points to the next block that is in use. If the entry is in the free list, it points to the next free block.

(d) Acknowledge Flag 304, is an entry that is used, according to the preferred embodiment of the invention, to lock a block of memory into the used list. When a block is first allocated by a user, the contents of that block of memory is undefined. Once the user is given a block, he must fill that memory with known values, and then may invoke the process described herein with reference to FIG. 7 to fill in the Acknowledge Flag 304 entry with a value that indicates that it has been acknowledged. This mechanism allows the process described herein with reference to FIG. 8 to return pointers to users on power up with some assurance that the pointers returned point to valid data.

(e) Size Adjust 305, is a value indicating the difference between the actual block size and the amount of memory that the user requested. This entry is, according to one embodiment of the invention, used when a pointer is returned to a user on power up. This number when subtracted from the actual block size which will produce the size of the block that the user really requested and this result is, according to the illustrative embodiment of the invention, also returned to the user along with the pointer.

(f) Memory 306, is the actual block of memory itself that is managed by allocated memory block header 300.

Prior to making reference to FIG. 4 thru FIG. 8 for specific examples of the processes contemplated by the invention, it should recalled that, according to the invention, the order in which data structures are manipulated is important so that there is a pointer to all blocks of memory at any point in time. This is the reason for the aforementioned pointers in the headers described hereinbefore with reference to FIG. 2 and FIG. 3.

Furthermore, it should be recalled that according to the invention the last "state" of the non-volatile memory, as stored in State Indicator 207 (previously described herein with reference to memory header 200), is important for ascertaining non-volatile memory stability following a power failure. If power goes down while manipulating the heap management data structures, State Indicator 207 makes cleanup fast and simple on power up as will be seen with reference to the exemplary processes set forth hereinafter.

It should also be recalled that, according to the invention, State Indicator 207 may only be modified in one atomic instruction; and that any time a list is modified or an allocated memory block header is modified (because of a split or coalesce), State Indicator 207 is set to indicate what is occurring. By following this procedure, if power goes down while performing the heap management functions contemplated herein, and then power comes back up, State Indicator 207 may be used to determine the last function that was performed.

Figure 4:
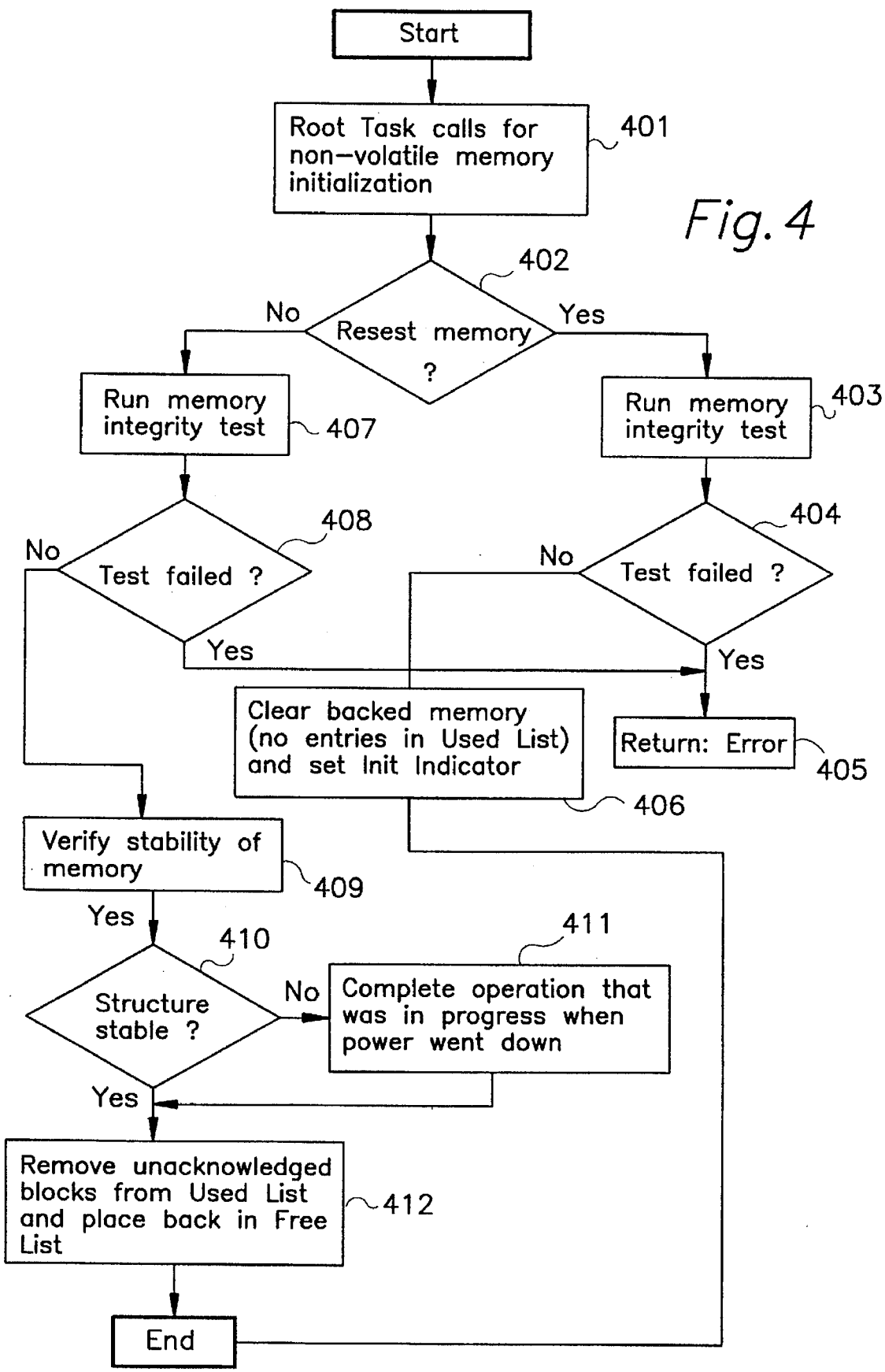
FIG. 4 depicts, in accordance with the teachings of one embodiment of the invention, an illustrative set of process steps for initializing non-volatile memory included in a programmable recording instrument, such as the exemplary recording instrument depicted in FIG. 1, whenever the recording instrument is powered up.

Reference should now be made to FIG. 4 which, as indicated hereinbefore (in accordance with the teachings of one embodiment of the invention), depicts an illustrative set of process steps for initializing non-volatile memory included in a programmable recording instrument, such as the exemplary recording instrument depicted in FIG. 1, whenever the recording instrument is powered up.

When the recording instrument is powered up, the non-volatile memory must be initialized. According to the illustrative embodiment of the invention being set forth herein, there are four exemplary conditions (reset conditions) that will cause all of the structure to be cleared and all of the memory to be freed:

(1) Init Indicator 201 is not set to the proper value. This indicates that the memory was never initialized or that the power source that sustained the non-volatile memory was removed.

(2) The difference between the current time and Time Stamp 202 in memory header 200 (when the time stamp is used) is greater than the maximum allowed time or the current time is less than the time stamp.

(3) The external clock has failed.

(4) The user has specifically requested that the non-volatile memory be cleared.

If none of the above conditions are met, the initialization process contemplated by the invention must verify the stability of the data structures used for heap management purposes, particularly if power went down while any of the heap management data structures were being manipulated.

The aforementioned stability may be determined by checking the aforementioned State Indicator 207 (in memory header 200) to see if a predetermined value that represents STABLE is present. If it is not stable, the initialization process contemplated by the invention attempts to repair the structures and bring them to a stable condition by completing certain operations in progress when power went down, as discussed hereinbefore.

With reference to FIG. 4 it may be seen that the non-volatile memory initialization process, contemplated by the illustrative embodiment of the invention, is shown called by a root task at step 401.

Next, the flowchart is essentially divided into two portions, which the branch occurring at step 402 in FIG. 4: one branch is a process for resetting (clearing) memory if one of the aforementioned exemplary memory reset conditions exist; the other branch is a process verifying the stability of the data structures in the backed memory if a reset is not to be performed.

The exemplary reset process depicted in FIG. 4 is shown to include the steps of:

(1) performing a non-volatile memory hardware integrity test (shown at step 403), which is meant as a hardware test to determine if the memory chips are still good, that read/write operations to memory can properly be performed, etc.

(2) Returning an error indication (at step 405) if it determined at step 404 that the memory integrity test failed.

(3) Clearing non-volatile memory (show at step 406), which, according to a preferred embodiment of the invention involves the steps (not shown in FIG. 4) of creating (initializing) the aforementioned non-volatile memory headers and setting Init Indicator 201, in memory header 200, to indicate initialization had been performed.

The exemplary stability-verification process, including steps to assure the integrity of the aforementioned data structures in non-volatile memory, is shown in FIG. 4 to include the steps of:

(1) performing a non-volatile memory hardware integrity test (shown at step 407), which is meant as a hardware test to determine if the memory chips are still good, that read/write operations to memory can properly be performed, etc.

(2) Returning an error indication (at step 405) if it determined at step 408 that the memory integrity test failed.

(3) Examining State Indicator 207 in memory header 200 (step 409), to determine non-volatile memory stability therefrom (step 410).

(4) Completing any operation in progress at the time of a power loss that affects non-volatile memory stability (step 411), whenever it is determined at step 410 that the non-volatile memory is unstable; and (5) Removing all allocated memory blocks not previously locked into the list of allocated memory blocks, returning the unlocked allocated blocks to the free list (step 412).

Figure 5:
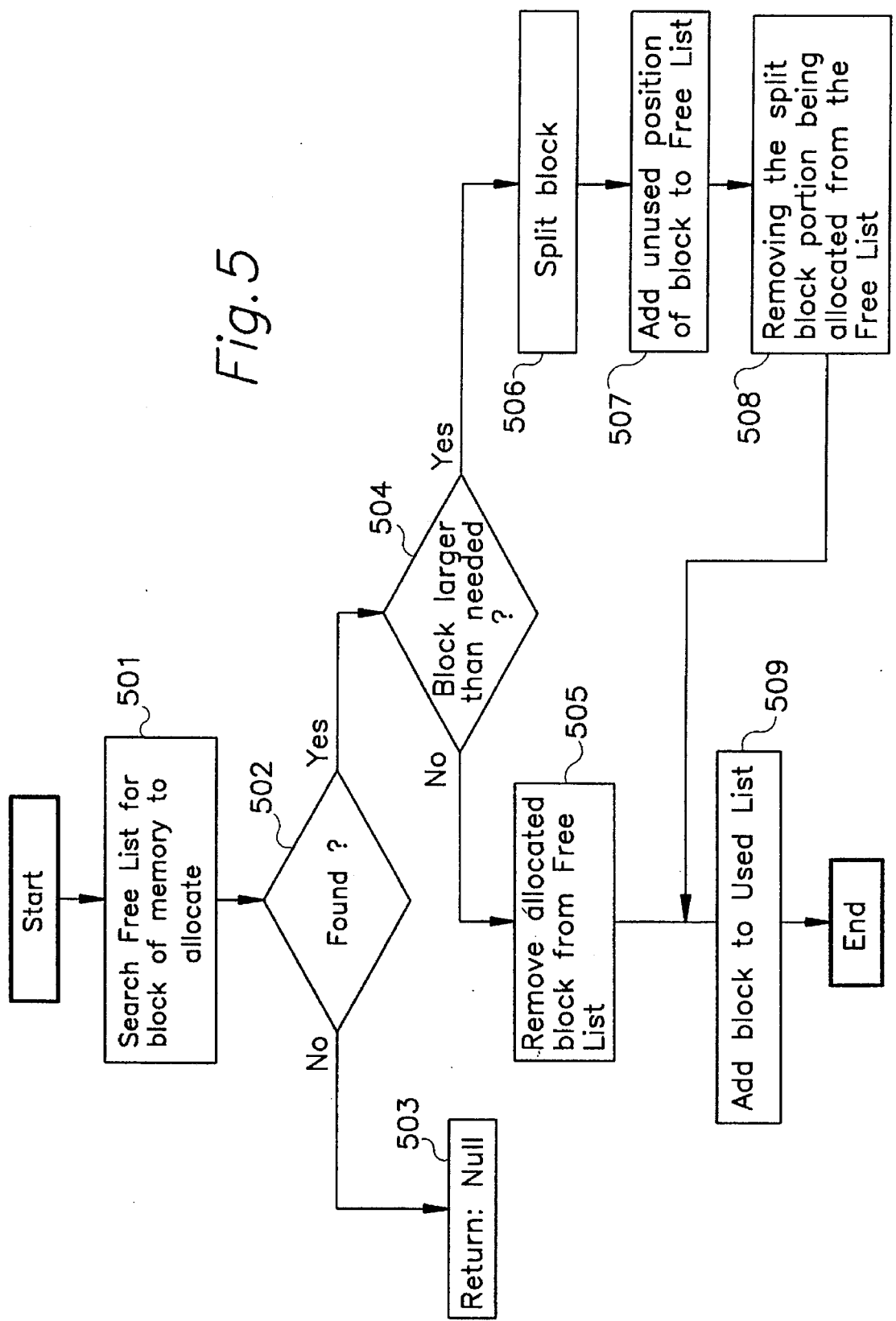
FIG. 5 depicts, in accordance with the teachings of one embodiment of the invention, an illustrative set of process steps for allocating memory from one of the memory blocks included in a list of free memory blocks, in response to a user request for memory allocation, where only atomic instructions to modify the exemplary memory header depicted in FIG. 2 and the exemplary allocated memory block header depicted in FIG. 3.

Reference should now be made to FIG. 5 which, as indicated hereinbefore, depicts (in accordance with the teachings of one embodiment of the invention), an illustrative set of process steps for allocating memory from one of the memory blocks included in a list of free memory blocks, in response to a user request for memory allocation. As stated hereinbefore, it is required, according to the teachings of the invention, that only atomic instructions be used in performing the allocation function when modifying exemplary memory header 200 depicted in FIG. 2, and when modifying exemplary allocated memory block header 300 depicted in FIG. 3.

Before explaining the details of the process depicted in the flowchart, an overview of the allocation process contemplated by the invention will be set forth.

To allocate a block of backed memory, the user provides two parameters to the heap management process contemplated herein: the size of the block being requested and the aforementioned unique user identifier.

The illustrative process depicted in FIG. 5 then finds the next closest multiple of the minimum block size. Current Working Pointer 203 and Current Partition Pointer 204 (shown in memory header 200 described hereinbefore with reference to FIG. 2) are set to NULL.

After this is done, the free list is searched for a block of memory that can be allocated. If a block of the exact size can be located, that block is used. If an exact size cannot be found, the biggest available block is used. The free list is sorted by block size (largest to smallest). If all available blocks are too small, a NULL is returned to the user.

If a block is located, Current Working Pointer 203 is filled in to point to that block. If the block is larger than the requested size, the block must be partitioned. The part of the block that is larger than what is needed is made its own block of memory and inserted into the free list.

The block that is to be used is removed from the free list and added to the front of the used list which is not sorted.

With reference to FIG. 5 it may be seen that the non-volatile memory allocation process, contemplated by the depicted illustrative embodiment of the invention, includes the steps of: (a) searching the list of free memory blocks for a block of memory to allocate (step 501); (b) determining, whenever a block of memory to allocate is found (step 502), if the memory block found is larger than needed; and returning the aforementioned Null when all available blocks of memory are too small (step 503); (c) if the memory block found is not larger than needed (as determined at step 504) removing the memory block found from the free list (step 505); (d) splitting the memory block found, if larger than needed, into a first block portion for allocation and a second block portion for return to the free list (step 506); (e) returning the second block portion to the free list whenever the second block portion is created (step 507); and (f) removing the first block portion from said free list whenever the second block portion is created (step 508); and (g) adding the properly sized block being allocated to the list of allocated memory blocks (step 509).

Figure 6:
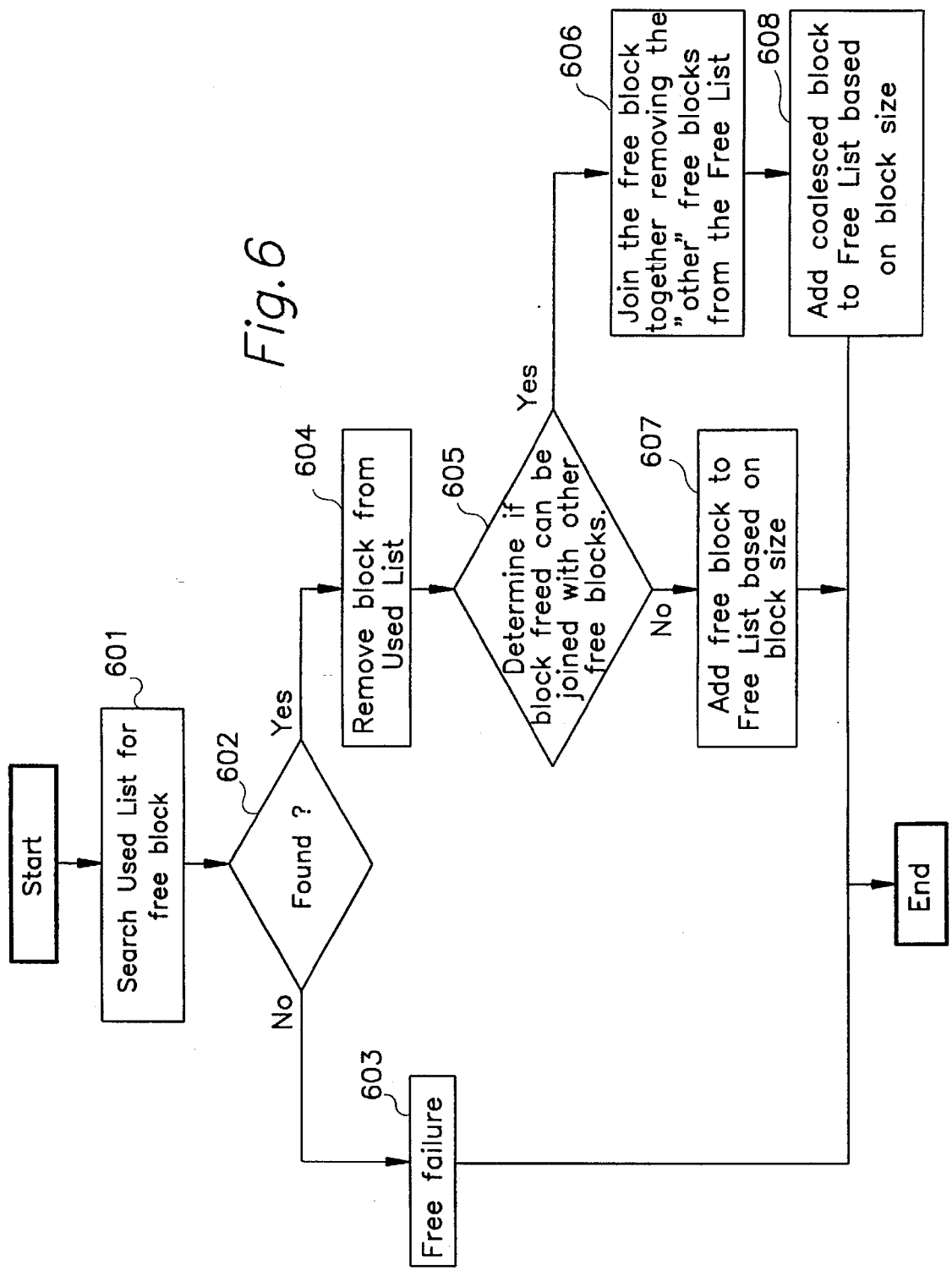
FIG. 6 depicts, in accordance with the teachings of one embodiment of the invention, an illustrative set of process steps for freeing a memory block included in a list of allocated memory blocks, in response to a user request for freeing memory, where only atomic instructions to modify the exemplary memory header depicted in FIG. 2 and the exemplary allocated memory block header depicted in FIG. 3.

Reference should now be made to FIG. 6 which, as indicated hereinbefore, depicts (in accordance with the teachings of one embodiment of the invention), an illustrative set of process steps for freeing a memory block included in a list of allocated memory blocks, in response to a user request for freeing memory. As stated hereinbefore, it is required, according to the teachings of the invention, that only atomic instructions be used in performing the freeing function when modifying exemplary memory header 200 depicted in FIG. 2, and when modifying exemplary allocated memory block header 300 depicted in FIG. 3.

According to the illustrative embodiment of the invention being set forth herein, to free (return) a block of memory to the free list it is first removed from the used list and then placed into the free list. Any blocks of memory that can be combined (adjacent blocks of free memory), are combined when inserting an entry into the free list.

With reference to FIG. 6 it may be seen that the non-volatile memory allocation process, contemplated by the depicted illustrative embodiment of the invention, includes the steps of: (a) searching the used list (list of allocated memory blocks) for the memory block being freed (step 601); and if not found (as determined at step 602), signalling an error (step 603); (b) removing the memory block being freed from the list of allocated memory blocks (step 604); (c) determining if the block being freed can be joined with another free block in the list of free memory blocks (step 605); (d) joining the free blocks together whenever it is determined that at least two free memory blocks may be coalesced (step 606); and (e) adding the freed block to the freed memory list based on block size (according to the preferred embodiment of the invention; though not required per se) at step 607 (when no joining was performed), or at step 608 (following the coalescing of blocks of memory).

Figure 7:
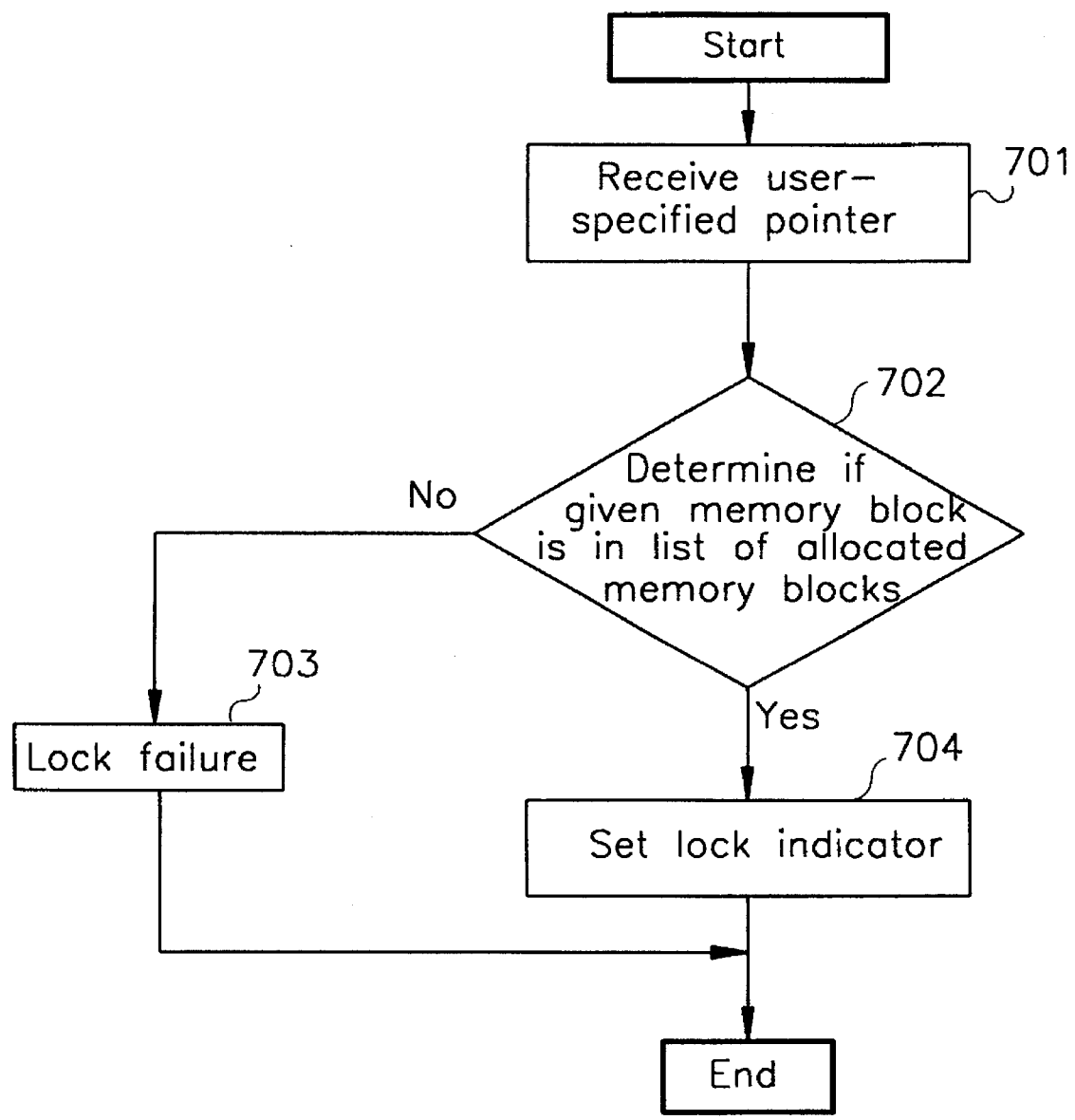
FIG. 7 depicts, in accordance with the teachings of one embodiment of the invention, an illustrative set of process steps for locking an allocated memory block into a list of allocated memory blocks in response to a user request for the lock.

Reference should now be made to FIG. 7 which, as indicated hereinbefore (in accordance with the teachings of one embodiment of the invention), depicts an illustrative set of process steps for locking an allocated memory block into a list of allocated memory blocks in response to a user request for the lock.

As mentioned hereinbefore, it is desirable to know whether or not an allocated block of memory contains known values; and that if power goes down at any time, the user will be able to obtain pointers to allocated memory owned by the user on power up with some assurance that the data stored in the allocated memory is valid.

The problem with simply returning a pointer to previously allocated memory to a user, without performing the acknowledge function (to lock an allocated block of memory into the used list) contemplated by the invention, is that the user may not have had an opportunity to initialize the allocated memory. Without the process (or similar processes) described with reference to FIG. 7, there would be no way to truly verify that the subject allocated memory has been initialized by the user.

The mechanism to ensure that only pointers to properly initialized memory blocks are returned to the user is the aforementioned acknowledge process contemplated as part of the present invention.

The acknowledge process, according to the preferred embodiment of the invention, works as follows: When a user obtains requested allocated memory, the user initializes the memory and then invokes the acknowledge process contemplated herein. Acknowledge Flag 304, described hereinbefore with reference to FIG. 3, is set in the appropriate allocated memory block header (e.g., allocated memory block header 300) using one atomic instruction.

As previously indicated hereinbefore with reference to the initialization process set forth in FIG. 4; on power up, all unacknowledged memory blocks are removed from the used list and put them back in the free list (step 412 in FIG. 4).

With reference to FIG. 7 it may be seen that the non-volatile memory acknowledge (memory locking) process, contemplated by the depicted illustrative embodiment of the invention, includes the steps of: (a) receiving a user specified pointer to memory included in a given memory block (step 701); (b) determining if the given memory block is in the list of allocated memory blocks (step 702), returning an error indication if it is not in the list of allocated memory blocks (step 703); and (c) setting Acknowledge Flag 304 (the lock indicator) in the allocated memory block header associated with the given memory block to indicate that the given memory block has been locked into the list of allocated memory blocks (step 704).

Figure 8:
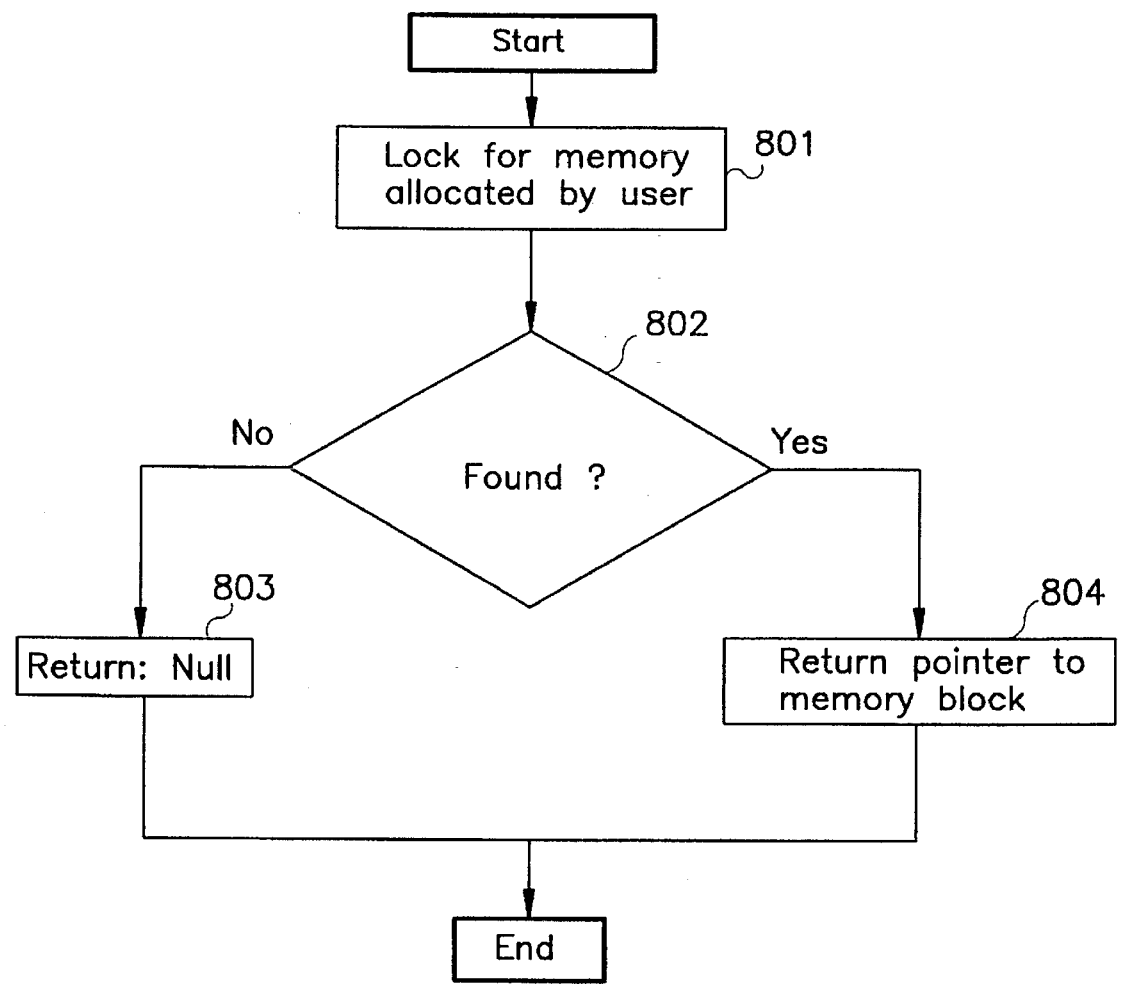
FIG. 8 depicts, in accordance with the teachings of one embodiment of the invention, an illustrative set of process steps for providing a pointer to a block of memory owned by a user, in response to a user request for such pointer, only when the memory block contains valid data.

Reference should now be made to FIG. 8 which, as indicated hereinbefore (in accordance with the teachings of one embodiment of the invention), depicts an illustrative set of process steps for providing a pointer to a block of memory owned by a user, in response to a user request for such pointer, only when the memory block contains valid data.

According to the preferred embodiment of the invention, on power up, a user tries to get any blocks of memory that they may have allocated before power went down. In order to do this, the user must provide his unique ID (discussed hereinbefore), together with an index (to be described hereinafter) to the heap management contemplated by the invention as responsible for returning pointers to previously allocated memory to the user.

The ID is used to identify the blocks that the user owns. The index is used to determine which block of memory that the user wants. For example, if the user always allocates three blocks, the user will (according to the illustrative embodiment of the invention being set forth herein) invoke the process that returns pointers (like the one illustrated by way of example in FIG. 8) three times using the indices 0, 1 and 2 respectively. If a NULL is returned it means that no more blocks of memory have been allocated by the user.

Accordingly, if a users invokes the exemplary process depicted in FIG. 8 three times, but gets a NULL when index 1 is used, it means that the users only had one block of memory allocated before power went down (index 0).

It should be noted that by the time a user is permitted to try and obtain pointers to previously allocated blocks of memory, it is assumed that the aforementioned initialization process (described with reference to FIG. 4) was performed. Accordingly, any memory allocated but not locked into the list of allocated memory blocks had been returned to the free list.

With reference to FIG. 8 it may be seen that the process of providing a pointer to a block of memory owned by a user (or blocks of memory if repetitively invoked), in response to a user request for such pointer (again, only if the memory block containing the memory had been locked into the list of allocated memory blocks) on power up, includes the illustrative steps of: (a) looking in the used list for memory allocated by the user (step 801); and if not found (as determined at step 802), signalling an error (step 803); and if found, returning the pointer to the memory block to the user (step 804) with the assurance that the pointer is to memory that was initialized by the user (by virtue of the lock bit having been set and resulting in the allocated memory being kept in used list following the initialization process previously described with reference to FIG. 4).

Figure 9:
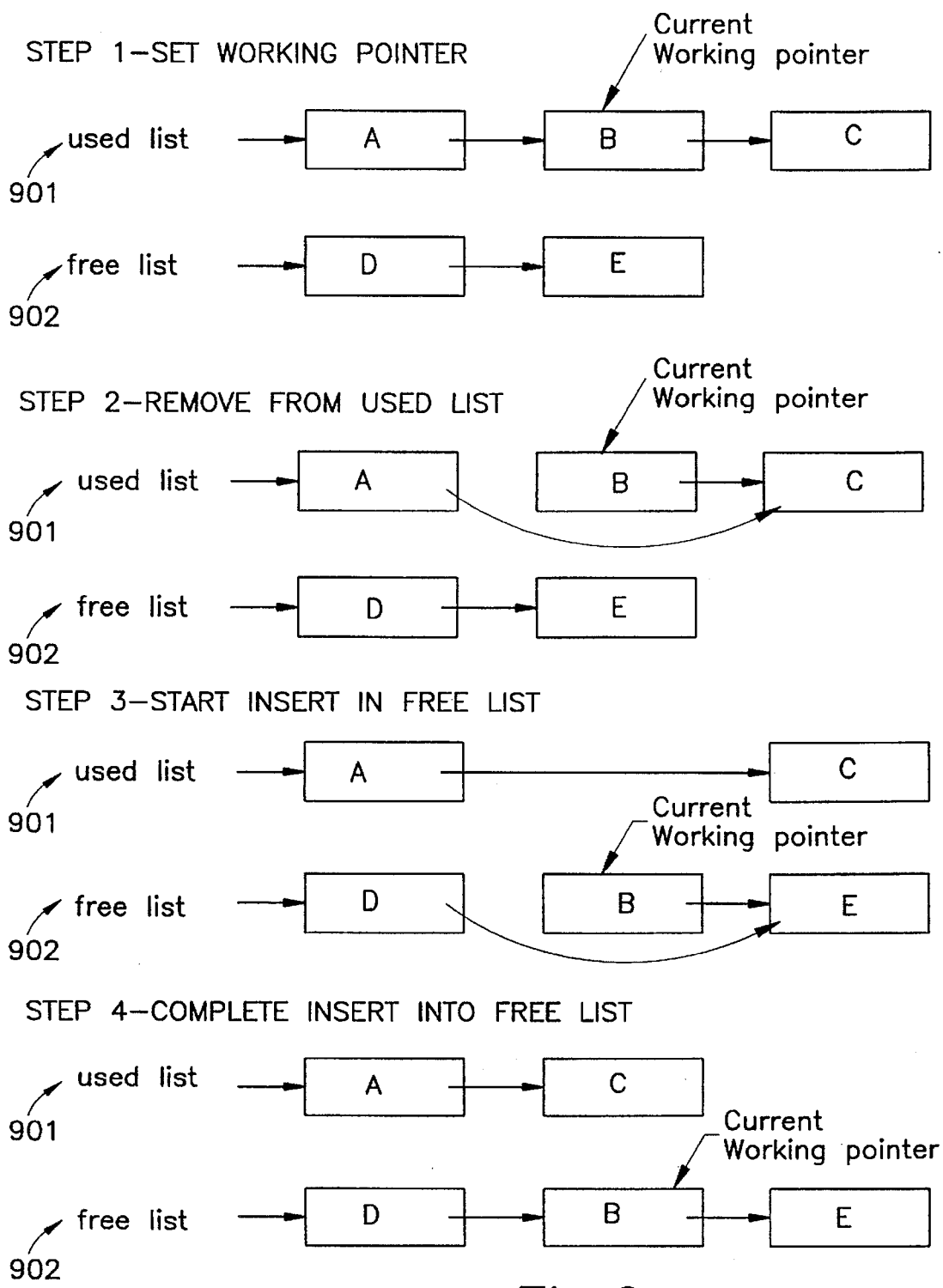
FIG. 9 depicts, in accordance with the teachings of the invention, an exemplary set of steps for removing an entry from one list and inserting it into another list, in a manner that avoids cross linking lists.

Reference should now be made to FIG. 9 which, as indicated hereinbefore (in accordance with the teachings of one embodiment of the invention), depicts an exemplary set of steps for removing an entry from one list and inserting it into another list, in a manner that avoids cross linking lists.

To avoid cross linking lists (the used list and the free list), entries are always completely removed from one list before they are added to the other list.

Removal from a list is one atomic instruction. Before removing an entry from a given list, Current Working Pointer 203 (in memory header 200) must point to the entry that is going to be moved. This allows the initialization process contemplated by the invention (described hereinbefore with reference to FIG. 4), following a power failure, to locate this entry if power goes down in the middle of performing these functions and complete the removal operation at step 411 in FIG. 4.

Adding to a new list, according to a preferred process contemplated by the invention, requires two instructions which must be performed in the following order:

(1) The block being added must set its Pointer To Next Block (exemplified by pointer 303 in FIG. 3), to the block that will follow it in the list.

(2) The block that will precede the new block must now be set to point to the new block (one atomic instruction), i.e., the Pointer To Next Block (pointer 303) in the block that will precede the new block must now be set to point to the new block With reference to FIG. 9 it may be seen that an exemplary process, of the type contemplated by the invention, for removing entry B from used list 901 and inserting it into the free list 902, involves the following steps where pointers within (and/or pointers to) the lists are altered.

First (step 1), the Current Working Pointer in memory header 202 is set to point to entry B (the entry to be removed) in used list 901.

Next (step 2), to remove entry B from used list 901, the Pointer To Next Block in entry A's allocated memory block header is modified (via a single atomic instruction) to point to entry C instead of entry B.

The insert process (two atomic instructions) may be seen as started at step 3 in FIG. 9, where the Pointer To Next Block in entry B's allocated memory block header, is modified (via the first single atomic instruction) to point to entry E instead of entry C; and (in step 4) the insertion of entry B into free list 901 is completed by modifying the Pointer To Next Block in entry D's allocated memory block header (again via the first single atomic instruction) to point to entry B instead of entry E.

It should be noted with reference to FIG. 9 that steps 2 and 3 represent the area at risk if the teachings of the invention were not employed to perform the aforestated removal and insertion operation. More particularly, if Current Working Pointer 203 were not in memory header 200, entry B would get lost if power went down before completing step 4.

Reference should now be made to FIG. 10 which, as indicated hereinbefore (in accordance with the teachings of one embodiment of the invention), depicts an exemplary set of steps indicating how a partition pointer may be used to partition a memory block, in a manner that protects data structure integrity.

According to the teachings of the invention, to avoid having incorrect block sizes, the aforementioned Current Partition Pointer 204 is maintained in memory header 200 to point to a partition. Current Partition Pointer 204 will point to a block being coalesced or to the location in a block where a division will occur. The aforementioned Current Working Pointer (pointer 203 in FIG. 2) will already be pointing to the other block being coalesced or the block being split. These two pointers together can be used to determine if the header size in a block is correct.

With reference to FIG. 10 it may be seen that the exemplary process of splitting a memory block (block A shown to include 100 bytes of memory), located in free list 1001; where (at step 1 in FIG. 10) block A points to block B (shown to include 30 bytes of memory), involves the following steps:

First (step 1), the Current Working Pointer 203 in memory header 200 is shown pointing to the block selected for being split (block A). Block A is shown pointing to block B in free list 1001.

Next, in step 2, the location in block A where the block division is to occur is pointed to by Current Partition Pointer 204. The size of the exemplary block being split off (25 bytes within block A), is designated as block C in FIG. 10, and an allocated memory block header (e.g., allocated memory block header 300 shown in FIG. 3), is created for the new block.

Step 3 in FIG. 10 shows the partitioned block (block C with 25 bytes included therein), being added to free list 1001. This is accomplished as shown at step 3 in FIG. 10 by modifying block B's pointer to the next block in the free list to point to block C (recalling free list 1001 is preferably sorted by size).

Finally, step 4 in FIG. 10 illustrates that the allocated memory block header for block A needs to be modified to reflect the fact that block A has been reduced from 100 bytes to 75 bytes.

It should be noted that the Current Working pointer 203 at all times points to block A (the block that needs to be modified as shown in step 4), and that the Current Partition Pointer facilitated being able to safely perform the splitting operation.

In particular, with reference to FIG. 10, it may be seen that step 3 is the area at risk if the Current Partition Pointer contemplated by the invention was not used in performing the exemplary splitting operation. By the time step 3 is performed, no opportunity existed to adjust block A's (the block pointed to by the Current Working Pointer) Block Size indicator 302 in exemplary allocated memory block header 300 (it should be 75 after the split of block A into blocks A and C); however, the partitioned block (block C) has already been added to free list 1001. Since the Current Partition Pointer is in the memory header 200 contemplated by the invention, one may check (after power is restored to the recording instrument) to see if the Current Working Pointer address plus the block size (block A's block size) overlaps the address that the Current Partition Pointer points to.

Those skilled in the art will recognize that processes for coalescing memory are essentially the inverse of any process used for splitting memory. According to the invention, the partitions must be deleted from the free list in the same manner as when moving from one list to another.

What has been described in detail hereinabove are methods and apparatus which meet all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A method for performing heap management and protecting the integrity of data structures created and stored in non-volatile memory included in a programmable recording instrument used for recording process data, comprising the steps of:

(a) defining a memory header data structure used for managing run time recorder operations and aiding in the recovery of any data structures being modified when and if power to the memory is lost, wherein said memory header includes a first pointer to a list of free memory blocks and a second pointer to a list of allocated memory blocks;

(b) defining an allocated memory block header, stored within each allocated memory block, used for determining block attributes, including an indicator to signal when a given memory block has been locked into said list of allocated memory blocks, a block ownership indicator and a pointer to the next allocated memory block, if any;

(c) initializing said non-volatile memory whenever the recording instrument is powered up, including the steps of determining if said non-volatile memory is to be reset and the step of verifying the stability of non-volatile memory whenever non-volatile memory is not reset;

(d) allocating memory from one of the memory blocks included in said list of free memory blocks, in response to a user request for memory allocation, utilizing only atomic instructions to modify said memory header and said allocated memory block header; and (e) locking an allocated memory block into said list of allocated memory blocks in response to a user request for the lock.

2. A method as set forth in claim 1 further comprising the step of freeing a memory block included in said list of allocated memory blocks, in response to a user request for freeing memory, utilizing only atomic instructions to modify said memory header and said allocated memory block header.

3. A method as set forth in claim 2 wherein said step of freeing further comprises the steps of:

(a) searching said list of allocated memory blocks for the memory block being freed;

(b) removing said memory block being freed from said list of allocated memory blocks;

(c) determining if said block being freed can be coalesced with another free block in said list of free memory blocks;

(d) joining the free blocks together whenever it is determined that at least two free memory blocks may be coalesced; and (e) adding the freed block, as extended by any joining performed in step (d), to said list of free memory blocks.

4. A method as set forth in claim 3 wherein said step of adding the freed block to said list of free memory blocks further comprises the step of sorting said list of free memory blocks based on block size.

5. A method as set forth in claim 2 further comprising the steps of:

(a) completely removing an entry said list of free memory blocks prior to adding said entry to said list of allocated memory blocks when performing said step of allocating memory; and (b) completely removing an entry said list of allocated memory blocks prior to adding said entry to said list of free memory blocks, when performing said step of freeing a memory block, to thereby avoid cross-linking lists when allocating memory and/or freeing a memory block.

6. A method as set forth in claim 1 wherein said step of locking further comprises the steps of:

(a) receiving a user specified pointer to memory included in a given memory block;

(b) determining if the given memory block is in said list of allocated memory blocks; and (c) setting the indicator in the allocated memory block header associated with said given memory block to indicate that said given memory block has been locked into said list of allocated memory blocks.

7. A method as set forth in claim 6 further comprising the step of providing a pointer to a block of memory owned by a user, in response to a user request for such pointer, only if the memory block containing said memory has been locked into said list of allocated memory blocks.

8. A method as set forth in claim 1 wherein said step of defining a memory header further comprises the step of including within said memory header (a) an indicator used to determine if non-volatile memory has been initialized; (b) a current working pointer to a block of memory that is being allocated or freed; (c) a current partition pointer to a block of memory that will be split off from a larger block of memory or will be coalesced with another block of memory; and (d) a state indicator used to determine the stability of non-volatile memory upon recovery from a power loss.

9. A method as set forth in claim 8 wherein said step of defining a memory header further comprises the step of including within said memory header a time stamp that is updated at a fixed interval, wherein said time stamp is used to determine how long power was off during a power failure.

10. A method as set forth in claim 9 wherein said step of defining an allocated memory block header further comprises the step of including within said allocated memory block header (a) an allocated memory block size indicator; (b) a block size adjustment indicator which is used to determine the actual size of the user memory allocation request; and (c) the actual set of memory locations allocated to the user.

11. A method as set forth in claim 10 wherein said step of determining if said non-volatile memory is to be reset further comprises the step of determining the validity of said indicator used to determine if non-volatile memory has been initialized.

12. A method as set forth in claim 11 which whenever it is determined that said non-volatile memory is to be reset, further comprises the steps of:

(a) performing a non-volatile memory hardware integrity test;

(b) clearing non-volatile memory, wherein said step of clearing includes the steps initializing said memory header data structure and said allocated memory block header, and setting said indicator used to determine if non-volatile memory has been initialized to indicate that initialization has occurred.

13. A method as set forth in claim 10 wherein said step of verifying the stability of non-volatile memory further comprises the steps of:

(a) examining said state indicator to determine non-volatile memory stability therefrom;

(b) completing any operation in progress at the time of a power loss that affects non-volatile memory stability whenever it is determined that said non-volatile memory is unstable; and (c) removing all allocated memory blocks not previously locked into said list of allocated memory blocks, returning the unlocked allocated blocks to said free list.

14. A method as set forth in claim 8 wherein said step of providing a pointer to a block of memory owned by a user, in response to a user request for such pointer, only if the memory block containing said memory has been locked into said list of allocated memory blocks.

15. A method as set forth in claim 1 wherein said step of allocating further comprises the steps of:

(a) searching said list of free memory blocks for a block of memory to allocate;

(b) determining, whenever a block of memory to allocate is found, if the memory block found is larger than needed;

(c) removing said memory block found from said free list if it is not larger than needed;

(d) splitting the memory block found, if larger than needed, into a first block portion for allocation and a second block portion for return to said free list;

(e) returning said second block portion to said free list whenever said second block portion is created;

(f) removing said first block portion from said free list whenever said second block portion is created; and (g) adding the properly sized block being allocated to said list of allocated memory blocks.

16. Apparatus for performing heap management and protecting the integrity of data structures created and stored in non-volatile memory included in a programmable recording instrument used for recording process data, comprising:

(a) programmable data processing means, including:

(a1) means for initializing non-volatile memory used for at least temporarily storing process data;

(a2) means for allocating memory blocks upon request;

(a3) means for freeing allocated memory upon request;

(a4) means for locking data blocks into a list of allocated memory blocks upon request; and (a5) means for obtaining and returning pointers to previously locked allocated blocks of memory upon request following a restoration of power to said instrument; and (b) non-volatile memory means, coupled to said programmable data processing means, for at least temporarily storing raw process data received and/or derived by said instrument, wherein said non-volatile memory includes a memory header data structure used for managing run time recorder operations and aiding in the recovery of any data structures being modified when and if power to the memory is lost, and an allocated memory block header, stored within each allocated memory block, used for determining block attributes, including an indicator to signal when a given memory block has been locked into said list of allocated memory blocks, a block ownership indicator and a pointer to the next allocated memory block in said list of allocated memory blocks, if any, wherein the contents of said memory header data structure and said allocated memory block header may only be modified utilizing atomic instructions.

17. Apparatus as set forth in claim 16 wherein said memory header data structure further comprises:

(a) a first pointer to a list of free memory blocks in said non-volatile memory;

(b) a second pointer to a list of allocated memory blocks in said non-volatile memory;

(c) an indicator used to determine if non-volatile memory has been initialized;

(d) a current working pointer to a block of memory that is being allocated or freed;

(e) a current partition pointer to a block of memory that will be split off from a larger block of memory or will be coalesced with another block of memory; and (f) a state indicator used to determine the stability of non-volatile memory upon recovery from a power loss.

18. Apparatus as set forth in claim 17 wherein said memory header data structure further comprises a time stamp that is updated at a fixed interval, wherein said time stamp is used to determine how long power was off during a power failure.

19. Apparatus as set forth in claim 18 wherein said non-volatile memory is capacitor backed random access memory.

20. Apparatus as set forth in claim 16 wherein said allocated memory block header further comprises:

(a) an allocated memory block size indicator;

(b) a block size adjustment indicator which is used to determine the actual size of the user memory allocation request; and (c) the actual set of memory locations allocated to the user.

21. A method for performing heap management and protecting the integrity of data structures created and stored in non-volatile memory included in a programmable recording instrument used for recording process data, comprising the steps of:

(a) allocating blocks of memory as requested by a user, wherein said step of allocating further comprises the step of maintaining blocks of allocated memory in a first list of memory blocks managed utilizing a memory header and further wherein each allocated memory block in said first list is further managed utilizing an allocated memory block header located within each allocated memory block;

(b) freeing blocks of memory as requested by a user, wherein said step of freeing further comprises the step of maintaining blocks of free memory in a second list of memory blocks managed utilizing said memory header;

(c) completely removing a specified allocated memory block from said first list before adding said specified allocated memory block to said second list, to prevent cross linking of said first and second list when performing said step of freeing;

(d) completely removing a specified free memory block from said second list before adding said specified free memory block to said first list to prevent cross linking of said first and second list when performing said step of allocating;

(e) locking an allocated memory block into said first list in response to a user request for the lock;

(f) providing a pointer to a block of memory owned by a user, in response to a user request for such pointer, only if the memory block containing said memory has been locked into said first list; and (g) utilizing only atomic instructions to modify said memory header and said allocated memory block header.

* * * * *